Figure 1:
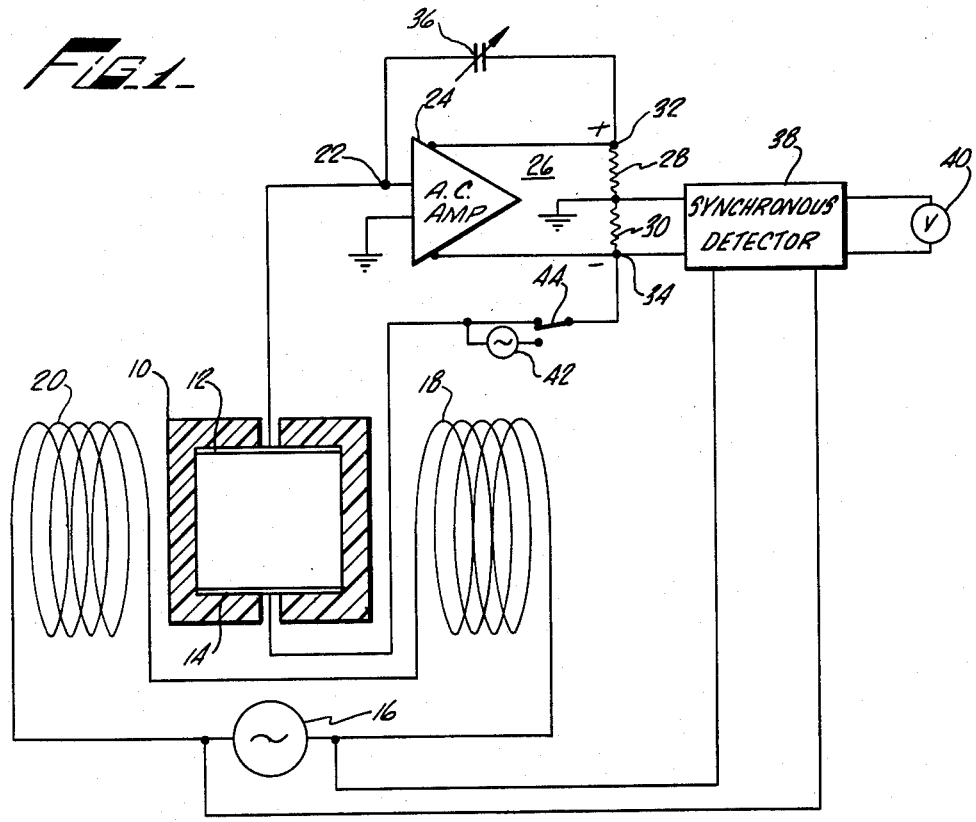

April 20, 1965  C. E. BERRY  3,178,941
INDUCTION FLOWMETER
Filed Aug. 7, 1961

INVENTOR.
CLIFFORD E. BERRY
BY Christie, Parker & Hale
ATTORNEYS.

3,178,941
INDUCTION FLOWMETER
Clifford E. Berry, Altadena, Calif., assignor to Consolidated Electrodynamics Corporation, Pasadena, Calif., a corporation of California
Filed Aug. 7, 1961, Ser. No. 129,693
6 Claims. (Cl. 73—194)

This invention relates to induction flowmeters and, more particularly, to improvements in induction type flowmeters for measuring the flow rate of dielectric media such as petroleum products.

When a conducting medium passes through a magnetic field a voltage is developed perpendicular to both the direction of flow and the magnetic field which is proportional to a product of the flux density B of the magnetic field and the velocity of the conducting medium $v$. This principle is commonly applied in induction flowmeters to measure the flow rate of conducting media. Until recently, however, it has been commonly believed that the principles of voltage induction were limited to measurement of the flow rate of a conducting medium. In a co-pending patent application, Serial No. 120,687, filed June 29, 1961 and assigned to the same assignee as the present invention, an induction type flowmeter is disclosed for measuring the mass flow rate of dielectric media having a conductivity of less than $1 \times 10^{-7}$ mhos per meter.

As described in the above mentioned patent application, the measurement of the mass flow rate of a dielectric medium is accomplished by providing a pair of spaced conducting plates. The dielectric medium is directed between the conducting plates and an alternating magnetic field is generated parallel to the plates and normal to the direction of flow.

As the dielectric medium moves in the magnetic field the sides of the dielectric medium adjacent to the conducting plates are polarized to develop a polarization charge between the conducting plates. In this manner the spaced conducting plates act as a capacitor having a predetermined capacitance in the absence of the dielectric medium and a different capacitance when the dielectric medium is directed between the plates.

Due to the polarization charge, a voltage is developed between the spaced conducting plates. To measure the voltage between the spaced conducting plates, the plates are shunted by a large external capacitor which, in effect, short circuits the plates. In this manner, the voltage developed across the external capacitor provides a direct measure of the mass flow rate of the dielectric medium passing between the conducting plates.

Although the voltage developed across the external capacitor represents a direct measure of mass flow rate, the capacitance of the spaced conducting plates in the presence of a dielectric medium is a function of the dielectric constant of the medium and therefore variable therewith. Thus, the voltage detected across the external capacitor is also a function of the dielectric constant of the medium and changes in the value of the dielectric constant of the medium produce changes in the magnitude of the detected voltage. The changes in magnitude of the detected voltage with changes in dielectric constant indicate falsely changes in the mass flow rate of the dielectric medium.

In view of the above, the induction flowmeter of the present invention includes means for providing a measurement of the volumetric flow rate of a dielectric medium independent of the dielectric constant of the medium.

Briefly, to accomplish this, the flowmeter of the present invention includes a pair of spaced conducting plates, means for directing a dielectric medium therebetween, and means for generating an alternating magnetic field parallel to the plates and normal to the direction of flow of the dielectric medium. Coupled to the spaced conducting plates is an amplifying means for amplifying the voltage developed between the plates. Coupled to the input of the amplifying means is a capacitance neutralizing network. The capacitance neutralizing network functions to neutralize the capacitance effects of the spaced conducting plates and any stray capacitance shunting the plates whereby the voltage amplified by the amplifying means is directly a function of the volumetric flow rate of the dielectric medium independent of its dielectric constant.

Preferably, the capacitance neutralizing network takes the form of a positive feedback network including a neutralizing capacitor shunting the amplifying means. The neutralizing capacitor is selected to have a capacitance equal to the capacitance of the spaced conducting plates in the absence of a dielectric medium between the plates and any stray capacitance shunting the plates. Due to the feedback connection of the neutralizing capacitor a current is fed back from the output of the amplifier to the input of the amplifier having a magnitude and phase which cancels out the currents flowing to the input of the amplifier through the capacitor formed by the spaced conductor plates in the absence of a dielectric medium and any stray capacitance shunting the conducting plates. The voltage then amplified by the amplifying means and detected at the output thereof is the open circuit voltage induced between the spaced conducting plates due to the motion of the medium and is independent of its dielectric constant.

Figure 2:
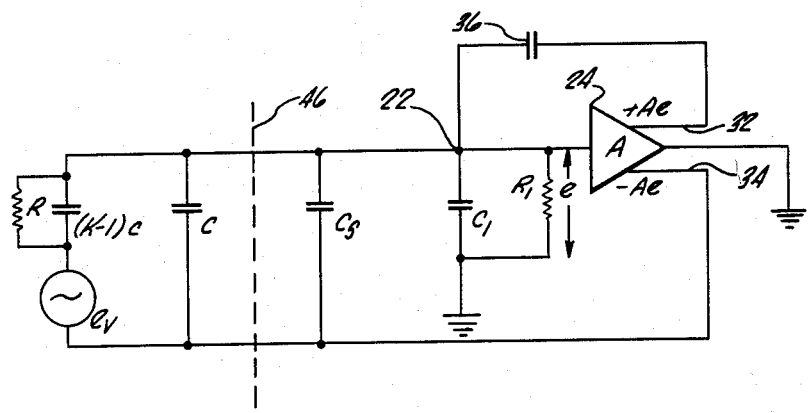

The above, as well as other features of the present invention, may be more clearly understood by reference to the following detailed description when considered with the drawings in which:

FIGURE 1 is a schematic representation of one form of the induction flowmeter of the present invention; and FIGURE 2 is a schematic representation of an equivalent electrical circuit of the induction flowmeter of the present invention.

In order to provide means for measuring the volumetric flow rate of a medium, the medium is constrained to flow through a pipe of nonconducting material indicated at 10. Two of the opposite inner faces of the pipe 10 are composed of a conducting material to form first and second spaced parallel conducting plates 12 and 14, respectively. The spaced conducting plates 12 and 14 form a capacitor having a predetermined capacitance in the absence of a dielectric medium in the pipe. With a dielectric medium flowing in the pipe 10 between the plates 12 and 14, the capacitance of the spaced parallel plates is modified by a factor substantially proportional to the dielectric constant of the medium.

To develop a charge between the spaced conducting plates and hence a voltage across the capacitor defined thereby, a magnetic field is generated parallel to the conducting plates and normal to the direction of flow of the dielectric medium in the pipe 10. To accomplish this, an alternating current source 16 is coupled to a pair of series connected coils 18 and 20. Current flowing from the source 16 through the coils 18 and 20 develops an alternating magnetic field through the pipe 10. When a dielectric fluid in the pipe 10 flows through the magnetic field the sides of the medium adjacent to the conducting plates 12 and 14 are polarized. As described in the above mentioned copending patent application, the polarization charge per unit area, $\sigma$, appearing at the opposite boundaries of the dielectric medium is given by the expression:

$$\sigma = \frac{(K-1)vB}{4\pi} \qquad (1)$$

where K is the dielectric constant of the dielectric medium, $v$ is the velocity of the medium, and B is the flux density of the magnetic field.

The polarization charge gives rise to a potential difference, V, between the plates 12 and 14 having a magnitude given by the expression:

$$V = \frac{K-1}{K} vBd \qquad (2)$$

where $d$ is the distance between the plates 12 and 14. Thus, the voltage developed between the spaced conducting plates 12 and 14, due to the movement of a dielectric medium therebetween, is a function of the dielectric constant of the medium. Accordingly, changes in the value of the dielectric constant of the medium as it passes between the spaced conducting plates 12 and 14, results in changes in the voltage between the spaced conducting plates. Since the voltage induced between the spaced conducting plates represents a measure of the flow rate of the medium, changes in the dielectric constant of the medium give rise to erroneous indications of changes in the flow rate of the medium.

To provide means for detecting a voltage proportional to the voltage induced by the motion of the medium in the pipe 10 and independent of dielectric constant, the present invention includes means for neutralizing the capacitance effects of the capacitor formed by the spaced conducting plates 12 and 14 and any stray capacitance shunting the plates. In practice, such neutralization may be accomplished by coupling the plate 12 to an input terminal 22 of a high gain amplifying means. The amplifying means is indicated, by way of example, as being an alternating current amplifier 24 having one of its input terminals coupled to ground. The amplifier 24 has a balanced output, indicated at 26, including a pair of series resistors 28 and 30. The series resistors 28 and 30 are coupled between output terminals 32 and 34. A junction of the resistors 28 ad 30 is coupled to ground.

As indicated, the output terminal 32 of the amplifier 24 is positive relative to ground when the output terminal 34 is negative relative to ground. The output terminal 34 is coupled to the plate 14 to provide a negative feedback path for the amplifier 24. The negative feedback path, among other things, functions to decrease the response time and increase the input impedance of the amplifier 24.

Coupled between the output terminal 32 and the input terminal 22 is the capacitance neutralizing network. The neutralizing network includes a capacitor 36 which functions as a positive feedback element shunting the amplifier 24.

As represented, the neutralizing capacitor 36 may be variable and is selected to have a capacitance equal to the capacitance of the spaced conducting plates 12 and 14 plus any stray capacitance shunting the plates. By so selecting the value of the neutralizing capacitor 36 a current signal is fed back to the input terminal 22 of the amplifier 24 having a magnitude and phase which exactly cancels the current flowing through the capacitor formed by the plates 12 and 14 and any stray capacitance shunting the plates. Since the negative feedback path provides the amplifier 24 with an extremely high input impedance, the voltage amplified by the amplifier 24 then becomes the open circuit voltage induced between the plates 12 and 14 due to the flow of the medium therebetween and is independent of the dielectric constant of the medium. Thus, by employing the neutralizing network the capacitance effects of the capacitor formed by the plates 12 and 14 and any shunting capacitance are eliminated and means are provided for developing a voltage which is proportional to the volumetric flow rate of a medium independent of dielectric constant.

To detect the voltage amplified by the amplifier 24, a synchronous detector 38 is coupled between the output terminal 34 and ground. The output of the detector 38 is coupled to a voltmeter 40 to provide an indication of the voltage amplified by the amplifier 24 and hence a measure of the volumetric flow rate of the medium in the pipe 10.

The synchronous detector 38 operates to reject an undesired induced voltage which is present in all induction type flowmeters. This undesired induced voltage is generally caused by transformer effects of the alternating magnetic field on the leads connecting the plates 12 and 14 to the alternating current amplifier. The undesired induced voltage is ninety degrees (90°) out of phase with the voltage signal due to the polarization charge appearing on the plates 12 and 14. Accordingly, by synchronizing the detector 38 with the output of the source 16, the undesired induced voltage is rejected and only the desired induced voltage due to the polarization of the dielectric fluid is developed at the output of the synchronous detector to be measured by the voltmeter 40.

In order to adjust the value of the neutralizing capacitor 36 to be equal to the value of the capacitance between the plates 12 and 14 and any stray capacitance, a small source of alternating current potential 42 is provided for series connection with the negative feedback loop through a switch 44. All fluid is removed from the pipe 10. The switch 44 is then operated to connect the source of potential 42 in series with the negative feedback loop. The capacitor 36 is then adjusted until the voltage detected by the voltmeter 40 is equal to zero. When the voltage detected by the voltmeter 40 is equal to zero the value of the capacitance of the capacitor 36 is equal to the capacitance of the plates 12 and 14 in the absence of a dielectric medium between the plates and any stray capacitance shunting the plates.

The neutralizing effects of the positive feedback loop shunting the amplifier 24 may be clearly understood by reference to the equivalent circuit configuration of FIGURE 2. In FIGURE 2, the portion of the circuit to the left of the dotted line 46 denotes an equivalent circuit for the Expression 2 above. In the equivalent circuit the source of potential $e_v$ represents the voltage induced between the plates 12 and 14 due entirely to the movement of the fluid in the pipe 10 and is equal to $Bvd$. The resistor indicated at R represents the conductivity of the fluid. The capacitor indicated at C represents the capacitance of the spaced plates 12 and 14 in the absence of a dielectric medium while the capacitor $(K-1)$ C represents the added capacitance due to the dielectric medium. The capacitor $C_s$ represents any stray capacitance shunting the spaced plates 12 and 14, while the capacitance represented at $C_1$ and the resistor indicated at $R_1$ represent the input impedance of the amplifier 24.

As represented by the equivalent circuit, the voltage $e_v$, due to the movement of the fluid in the magnetic field, is attenuated by the parallel connected capacitors C and $C_s$ to give rise to a voltage between the plates 12 and 14 which is attenuated by a factor approximating $$\frac{K-1}{K}$$

If the capacitance effects of the capacitors C and $C_s$ are neutralized however, the voltage amplified by the amplifier 24 becomes the open circuit voltage developed between the input terminal 22 and ground which is a direct function of the motion of the medium between the plates 12 and 14 independent of the dielectric constant of the medium. In the preferred form of the present invention, the capacitance effects of C and $C_s$ are neutralized by the positive current feedback through the capacitor 36. Utilizing nodal analysis about the input terminal 22 it may be shown that if the gain of the amplifier 24 is sufficiently large and if the value of the neutralizing capacitor 36 is adjusted to be equal to the capacitance of the capacitors C and the stray capacitance $C_s$, the feedback current flowing through the capacitor 36 is equal in magnitude and opposite in phase to a total of the currents flowing through the capacitors C and $C_s$. Under such conditions the voltage amplified by the amplifier 24 becomes the open circuit voltage which is equal to the voltage $e_v$. Since the voltage $e_v$ is equal to the induced voltage between the plates 12 and 14 due entirely to the flow of a medium in the pipe 10, the voltage detected by the voltmeter 40 is directly proportional to the volumetric flow rate of the medium and is independent of its dielectric constant.

What is claimed is:

1. An induction type flowmeter for measuring volumetric flow rate comprising: first and second parallel conducting plates defining a first capacitor; means for directing a fluid between the plates; means for generating an alternating magnetic field parallel to the first and second plates and normal to the direction of fluid flow; high gain alternating current amplifying means coupled to the first conducting plate; said amplifying means having a balanced output; negative feedback means coupled between the output of the amplifying means and the second conducting plate; and positive feedback means including a second capacitor coupled between the output of the amplifying means and the first conducting plate, the second capacitor having a capacitance equal to the capacitance of the first capacitor in the absence of fluid between the plates and any stray capacitance shunting the first and second plates.

2. In a flowmeter for detecting the volumetric flow rate of a fluid including a pair of spaced conducting plates defining a first capacitor having a predetermined capacitance, means for directing a fluid between the plates, and means for applying a magnetic field having lines of force passing between the plates and oriented at right angles to the direction of fluid flow, the combination of: a high gain amplifying means coupled to one of the pair of conducting plates; negative feedback means coupled between the amplifying means and a second one of the pair of conducting plates; positive feedback means including a second capacitor shunting the amplifying means, the second capacitor having a capacitance equal to the capacitance of the first capacitor in the absence of a fluid between the plates plus any stray capacitance shunting the first capacitor; and voltage detecting means coupled to the output of the amplifying means.

3. An induction type flowmeter for measuring volumetric flow rate comprising: a pair of spaced conducting plates defining a capacitor; means for directing a fluid between the plates; means for generating a magnetic field having lines of force passing between the plates and oriented at right angles to the direction of fluid flow; high gain amplifying means coupled to the conducting plates; voltage detection means coupled to the amplifying means; and a positive feedback network coupled to the amplifying means output and to at least one of the plates to shunt the amplifying means and neutralize the capacitance of the capacitor in the absence of a fluid between the plates and any stray capacitance shunting the capacitor, whereby voltages detected by the voltage detection means are directly proportional to the flow rate of the fluid independent of the dielectric constant.

4. The apparatus defined in claim 3 wherein the positive feedback network includes a neutralizing capacitor shunting the amplifying means, the neutralizing capacitor having a capacitance equal to the capacitance of the capacitor defined by the spaced conducting plates in the absence of a fluid between the plates and any stray capacitance shunting the plates.

5. In a flowmeter for detecting the volumetric flow rate of a fluid including a pair of spaced conducting plates defining a capacitor, means for directing a fluid between the plates, and means for applying the magnetic field having lines of force passing between the plates and oriented at right angles to the direction of fluid flow, the combination of: high gain amplifying means coupled to the conducting plates; voltage detection means coupled to the amplifying means; and a positive feedback network coupled to the amplifying means output and to at least one of the plates to shunt the amplifying means and neutralize the capacitance of the capacitor in the absence of a fluid between the plates and any stray capacitance shunting the conducting plates whereby the voltage detected by the voltage detecting means is a direct measure of the flow rate of the fluid independent of dielectric constant.

6. The apparatus defined in claim 5 wherein the positive feedback network includes a neutralizing capacitor shunting the amplifying means, the neutralizing capacitor having a capacitance equal to the capacitance of the first capacitor in the absence of a fluid between the plates and any stray capacitance shunting the conducting plates.

References Cited by the Examiner
UNITED STATES PATENTS

| | | | |
|---|---|---|---|
| 2,607,223 | 8/52 | Fleming | 73—194 |
| 2,722,122 | 11/55 | Soffel | 73—194 |
| 2,733,604 | 2/56 | Coulter | 73—194 |
| 2,771,771 | 11/56 | Kamp et al. | 73—194 |
| 2,808,723 | 10/57 | Buntenback | 73—194 |
| 2,924,781 | 2/60 | Wilson et al. | 330—104 |
| 3,005,342 | 10/61 | Head | 73—194 |
| 3,039,306 | 6/62 | Koblenz et al. | 73—194 |

RICHARD C. QUEISSER, *Primary Examiner.*
ROBERT L. EVANS, *Examiner.*